(12) United States Patent
Cheng

(10) Patent No.: US 6,492,590 B1
(45) Date of Patent: Dec. 10, 2002

(54) LIQUID-PROOF ENCLOSURE OF ELECTRICAL DEVICE

(76) Inventor: Ching Chi Cheng, 9F, No. 250-1, Section 2, Jin Cheng Road, Tucheng City, Taipei (TW)

( * ) Notice: Subject to any disclaimer, the term of this patent is extended or adjusted under 35 U.S.C. 154(b) by 0 days.

(21) Appl. No.: 09/903,554

(22) Filed: Jul. 13, 2001

(51) Int. Cl.[7] ................................................ H02G 3/08
(52) U.S. Cl. .................. 174/50; 174/50; 174/50.52; 174/17; 174/17 VA; 52/27; 52/198; 52/204.1; 220/2.1; 220/3.2; 220/581; 220/313; 220/312; 220/317
(58) Field of Search ................... 174/50, 17, 17 VA, 174/50.52, 52.1; 292/317; 220/378; 52/393; 602/3; D13/156, 139.6

(56) References Cited

U.S. PATENT DOCUMENTS 5,306,870 A * 4/1994 Abat ..................... 174/65 R
5,650,591 A * 7/1997 Matsushita et al. ..... 174/17 CT
5,845,803 A * 12/1998 Saito et al. ............. 220/222
5,912,433 A * 6/1999 Pulido et al. ............ 174/74 R

* cited by examiner

Primary Examiner—Dean A. Reichard
Assistant Examiner—Anton Harris
(74) Attorney, Agent, or Firm—Rosenberg, Klein & Lee

(57) ABSTRACT

A liquid-proof enclosure includes first and second casing members engaging each other to define an interior space for receiving, retaining and protecting an electrical device. Each casing member has a mating flange engaging each other to encase the electrical device. A rib is formed along the mating flange of the first casing member and a corresponding slot is defined along the mating flange of the second casing member for receiving and engaging the rib thereby attaching the first and second casing members together and increasing length of a possible leakage path between the first and second casing members. An opening is defined between the first and second casing members. At least a circumferential slot is defined along a circumferential wall of the opening. A cable retainer retaining a cable forms ribs received in the slot of the opening for attaching the cable retainer to the first and second casing members and to prevent liquid leakage into the enclosure.

3 Claims, 13 Drawing Sheets

LIQUID-PROOF ENCLOSURE OF ELECTRICAL DEVICE

FIELD OF THE INVENTION

The present invention generally relates to an enclosure for encasing and protecting an electrical device, and in particular to a liquid-proof structure of an electrical device enclosure.

BACKGROUND OF THE INVENTION

Electrical devices, such as printed circuit boards, have been widely used in a variety of applications, including control, detection, power conversion/regulation, and communication. For example, a control unit of a lighting device comprises a power conversion/regulation controller and a photo switching circuit. A lot of electrical/electronic elements are included in the circuit. To ensure proper operation of the control unit, protection of the electrical/electronic elements from severe environments must be exercised.

Conventionally, an electrical/electronic device is protected by being encased in an enclosure made of insulation material. Such enclosures are in general not water proof. In other words, such an enclosure cannot prevent water from penetrating into the enclosure. The humidity may damage the electrical/electronic device encased in the enclosure.

To be operable outdoors, an electrical/electronic device must be protected by water-proof enclosures. To ensure water-proofness, fusion caused by ultrasonic welding is employed to seal parts of the enclosure together. However, the sealing formed by fusion may deteriorate after a long term use, resulting in water leakage into the enclosure. Sealing formed by other means may also surfer the same problem.

An approach to solve the leakage problem is to completely encase an electrical/electronic with resin materials. Excellent water-proofness can be achieved. However, encasing an electrical/electronic device with resin materials is very expensive and may substantially increase the overall weight of the electrical/electronic device. Furthermore, high temperature resulting from injection of the resin materials onto the electrical/electronic device may damage temperature sensitive electrical/electronic elements. In addition, completely encasing an electrical/electronic device with resin materials hinders repairing or replacement of parts of the electrical/electronic device. The resin materials may also cause environmental problems.

It is thus desirable to provide a liquid-proof enclosure for electrical/electronic device for overcoming the above-discussed problems.

SUMMARY OF THE INVENTION

Accordingly, an object of the present invention is to provide a liquid-proof enclosure comprised of a plurality of casing members, rib-slot pairs being formed between the casing members for increasing the length of a possible leakage path between the casing members and more effectively preventing liquid from penetrating into the interior of the enclosure.

Another object of the present invention is to provide a liquid-proof enclosure which is capable to achieve liquid-proofness without injection of resin material therein.

A further object of the present invention is to provide a liquid-proof enclosure which allows replacement/repairing of an electrical device encased therein.

In accordance with the present invention, a liquid-proof enclosure comprises first and second casing members engaged with each other to define an interior space therebetween for receiving, retaining and protecting an electrical device. Each casing member has a mating flange engaging each other to encase the electrical device. A rib is formed along the mating flange of the first casing member and a corresponding slot is defined along the mating flange of the second casing member for receiving and engaging the rib thereby attaching the first and second casing members together and increasing the length and thus effecting blockage of possible leakage path between the first and second casing members. An opening is defined between the first and second casing members. At least a circumferential slot is defined along a circumferential side wall of the opening. A cable retainer retaining a cable forms ribs received in the slot of the opening for attaching the cable retainer to the first and second casing members and to prevent liquid leakage into the enclosure.

BRIEF DESCRIPTION OF THE DRAWING

The present invention will be apparent to those skilled in the art by reading the following description of preferred embodiments thereof, with reference to the drawings, wherein.

DETAILED DESCRIPTION OF THE PREFERRED EMBODIMENTS

Figure 1:
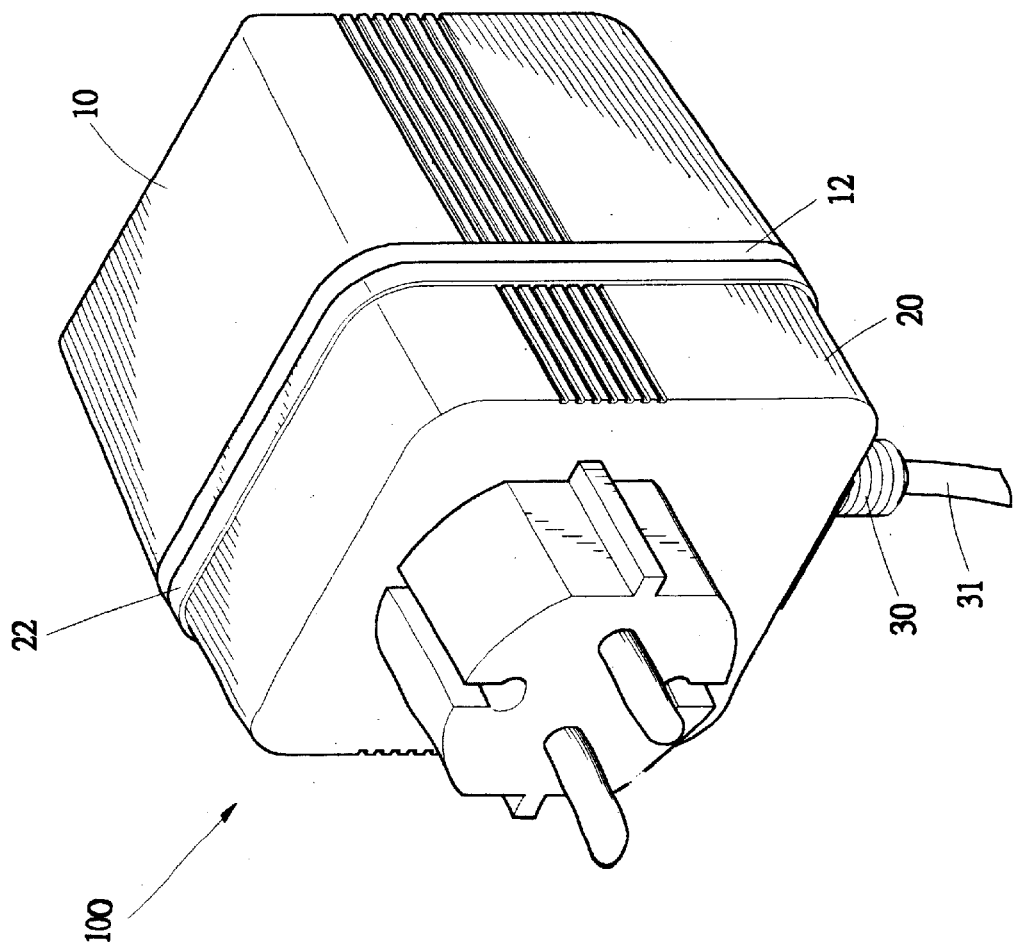
FIG. 1 is a perspective view of a liquid-proof enclosure constructed in accordance with a first embodiment of the present invention.
Figure 2:
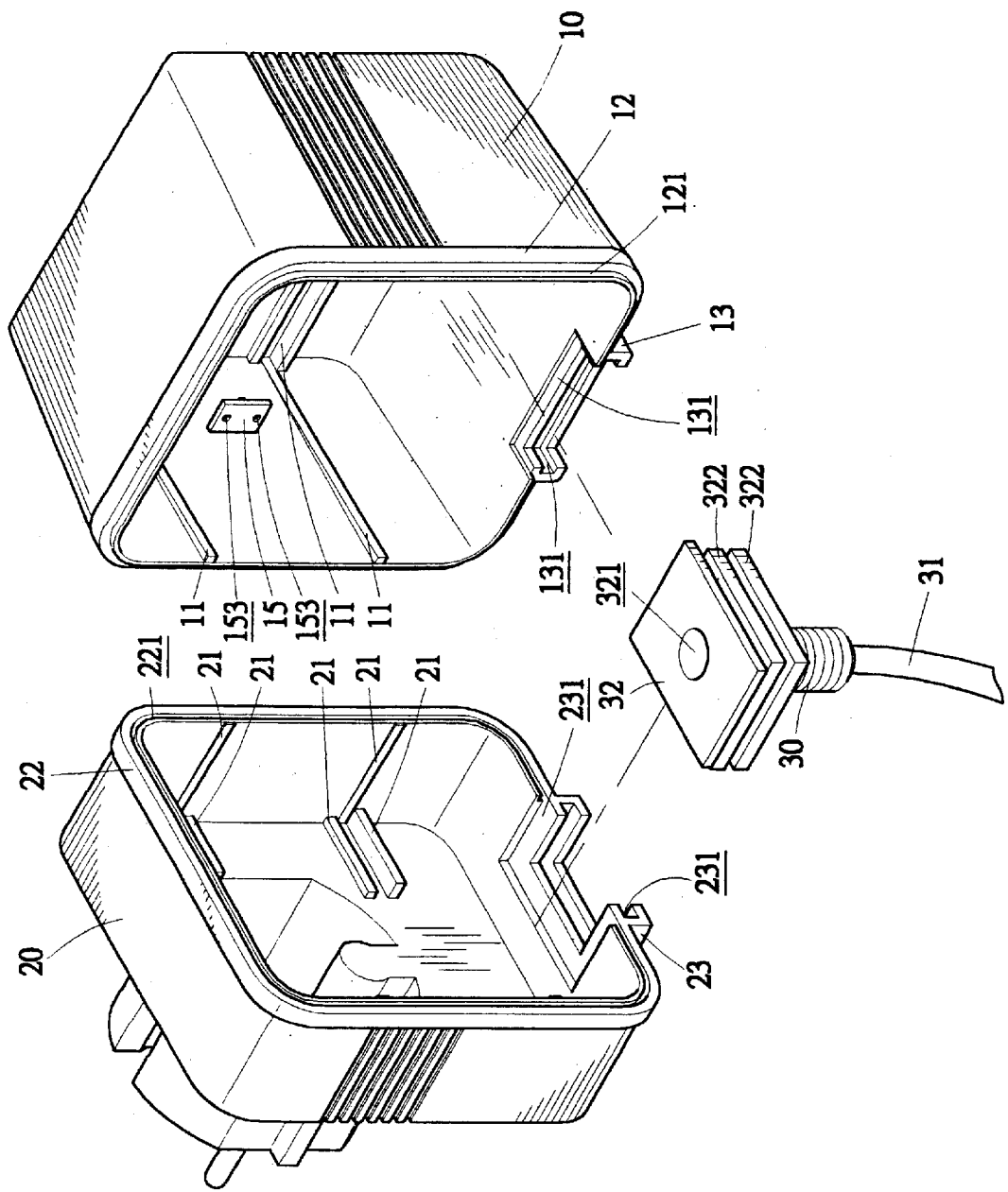
FIG. 2 is an exploded view of the liquid-proof enclosure of FIG. 1.
Figure 3:
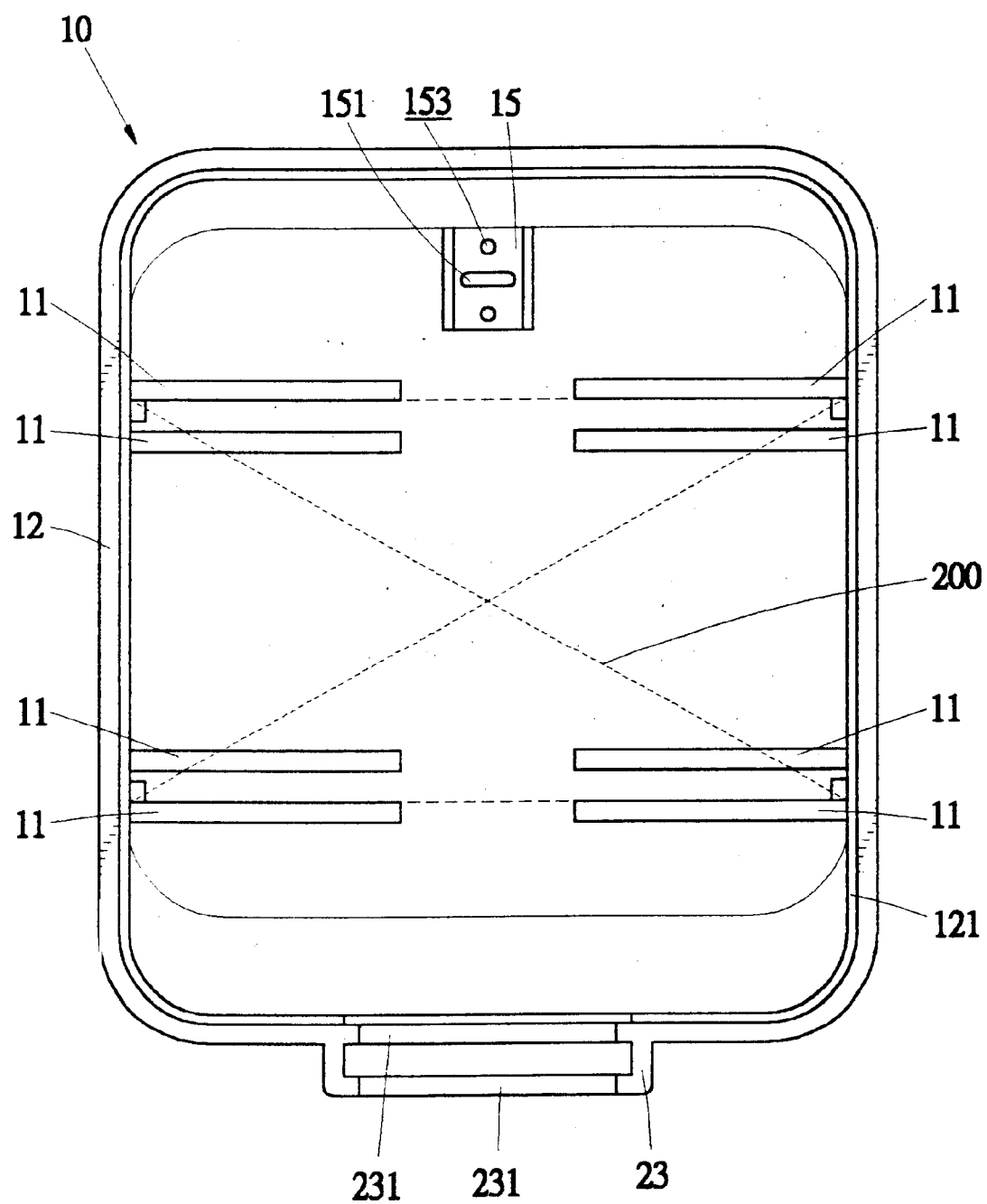
FIG. 3 is a plan view of a first casing member of the enclosure of FIG. 1 showing inside support ribs retaining a transformer.

With reference to the drawings and in particular to FIGS. 1–3, a liquid-proof enclosure constructed in accordance with a first embodiment of the present invention, generally designated with reference numeral 100, is adapted to encase and protect electrical/electronic means, such as a printed circuit board and related electrical/electronic parts from damage caused by liquid, such as water, and humidity. The enclosure 100 comprises first and second casing members 10, 20 mated with each other to define an interior space therebetween for receiving and retaining the electrical/electronic means. The enclosure 100 illustrated in FIGS. 1–3 is adapted to receive and protect a photo switching circuit and a lamp controlling circuit for controlling the operation of a lamp string or a lighting device (not shown). Support ribs 11, 21 are formed inside the first and second casing members 10, 20 for supporting and fixedly retaining a core of an electrical transformer 200 inside the enclosure 100.

Figure 4:
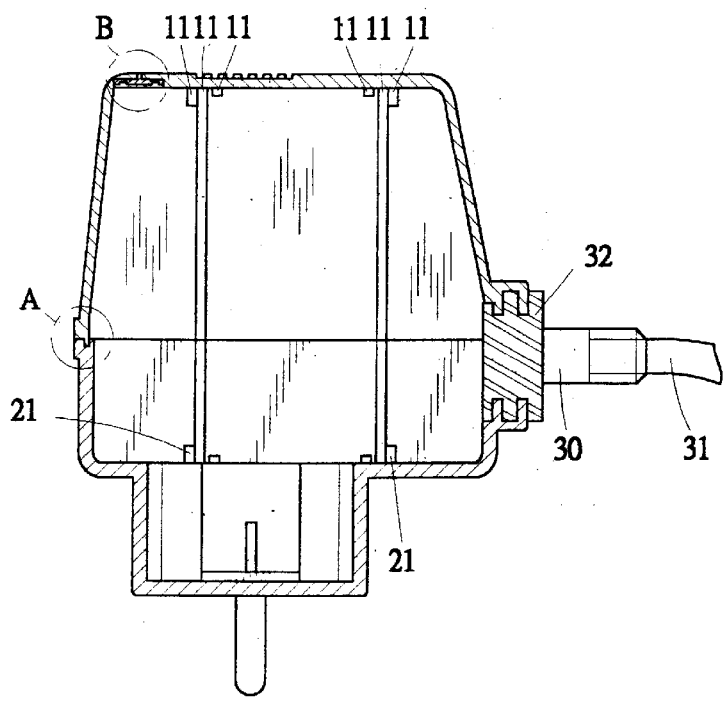
FIG. 4 is a cross-sectional view of the liquid-proof enclosure of FIG. 1.
Figure 5:
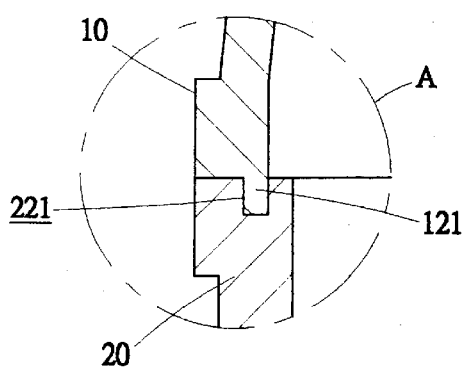
FIG. 5 is an enlarged view of encircled portion A of FIG. 4.
Figure 6:
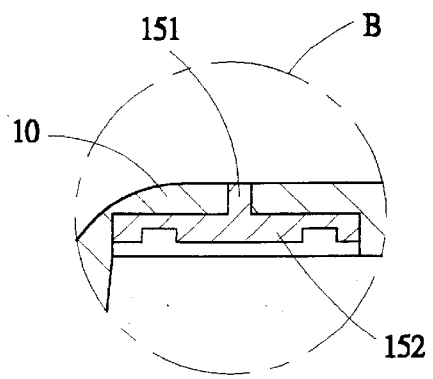
FIG. 6 is an enlarged view of encircled portion B of FIG. 4.

Also referring to FIGS. 4–6, each casing member 10, 20 has an edge corresponding to and engaging each other to form the enclosure 100. A mating flange 12, 22 is formed along the edge of each casing member 10, 20. The mating flange 12 forms a securing rib 121 coextensive therewith. The mating flange 22 defines a slot 221 coextensive therewith for receiving and engaging the securing rib 121 thereby attaching the casing members 10, 20 to each other. Corresponding cutouts 13, 23 are formed on the edges of the casing members 10, 20 for forming a passage or opening for a power cable 31 when the casing members 10, 20 are secured to each other. Each cutout 13, 23 defines at least one slot 131, 231 in a side wall thereof, the slots 131, 231 being corresponding to each other in location. In the embodiment illustrated in FIGS. 1–3, each cutout 13, 23 forms two such slots 131, 231.

A cable retainer 30 to which the cable 31 is attached comprises an expanded portion 32 forming circumferential ribs 322 received and retained in the slots 131, 231 thereby attaching the cable retainer 30 and thus the cable 31 to the enclosure 100. A bore 321 is defined in the cable retaining 30 and is in communication with the interior space of the enclosure 100 for guiding conductors of the cable 31 into the enclosure 100.

An opening 14 is defined in the first casing member 10 for passing surrounding light into the enclosure 100. A lens member 15 comprises a base 152 attached to first casing member 10 and a projection 151 extending from a first surface of the base 152 and snugly received in the opening 14 of the first casing member 10. Two cavities 153 are defined in an opposite second surface of the base 152 for receiving and retaining photo detecting devices (not shown), such as photo sensitive resistors and photo transistors, of the electrical/electronic means.

The casing members 10, 20 can be secured to each other by any known means, such as bolt and nut, snap fitting and ultrasonic welding. In the embodiment illustrated, the securing rib 121 of the first casing member 10 is received in the slot 221 of the second casing member 20 and is ultrasonic-welded to the second casing member 20 thereby securing the casing members 10, 20 together.

Due to the reception of the securing rib 121 of the first casing member 10 in the slot 221 of the second casing member 20, a possible leakage path for liquid to penetrate into the enclosure 100 must be extended around the securing 121. This increases the length of the possible leakage path as compared to an enclosure structure wherein only edge-to-edge engagement is formed between the mating flanges 21, 22 of the casing members 10, 20, and thus effectively blocks liquid from entering the enclosure 100. Similarly, the ribs 322 of the cable retainer 30 received in the slots 131, 231 of the casing members 10, 20 also effect liquid-proofness between the casing members 10, 20 and the cable retainer 30. In addition, in the embodiment illustrated, the cable retainers 30 has two ribs 322, which more effectively prevents liquid from entering the enclosure 100. A similar structure is also formed between the lens member 15 and the opening 14 of the first casing member 10. All these structures intend to increase the length of possible liquid leakage path into the enclosure 100 to effect blockage of liquid penetration into the enclosure 100.

Figure 7:
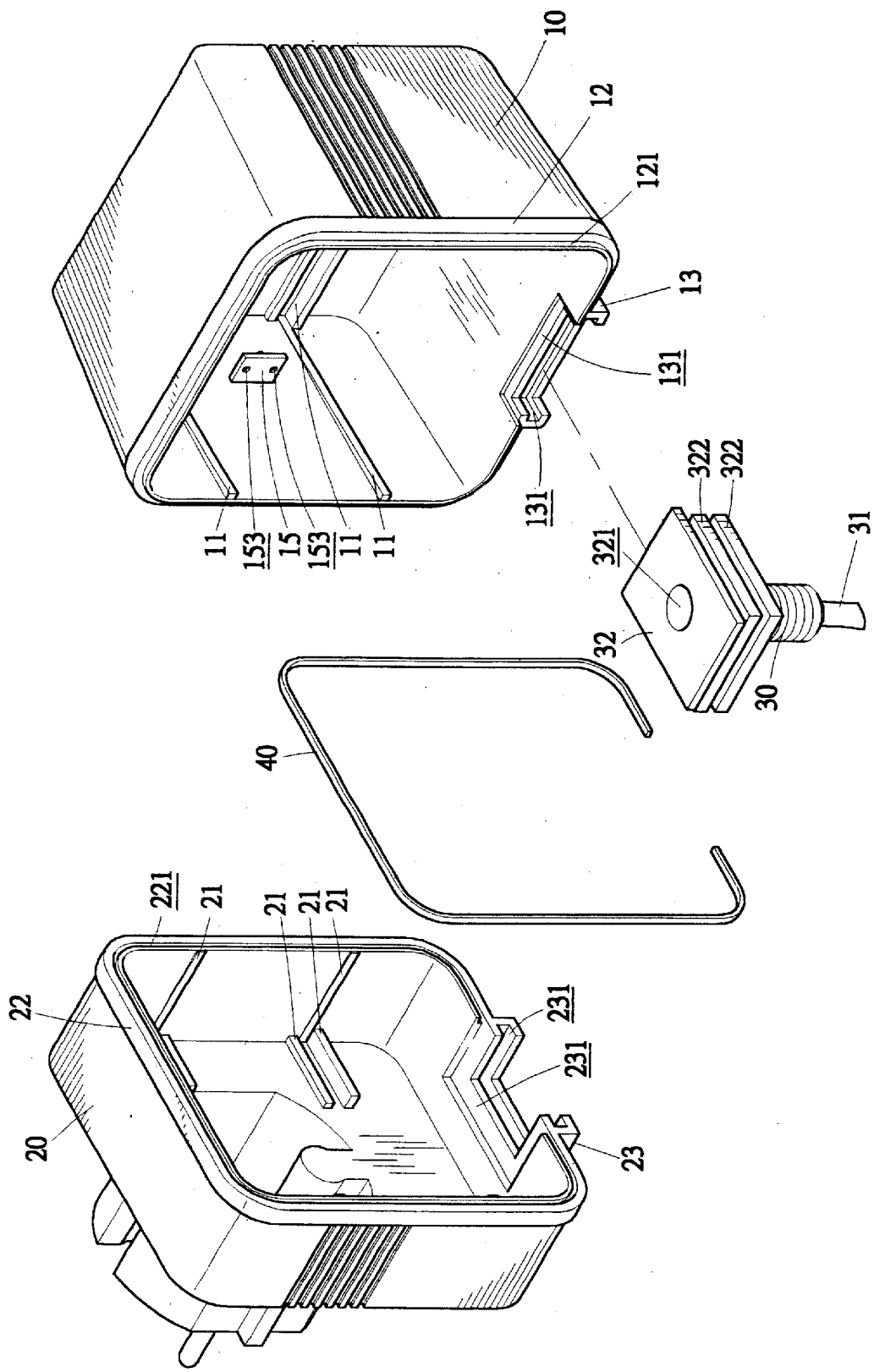
FIG. 7 is an exploded view of a liquid-proof enclosure constructed in accordance with a second embodiment of the present invention.
Figure 8:
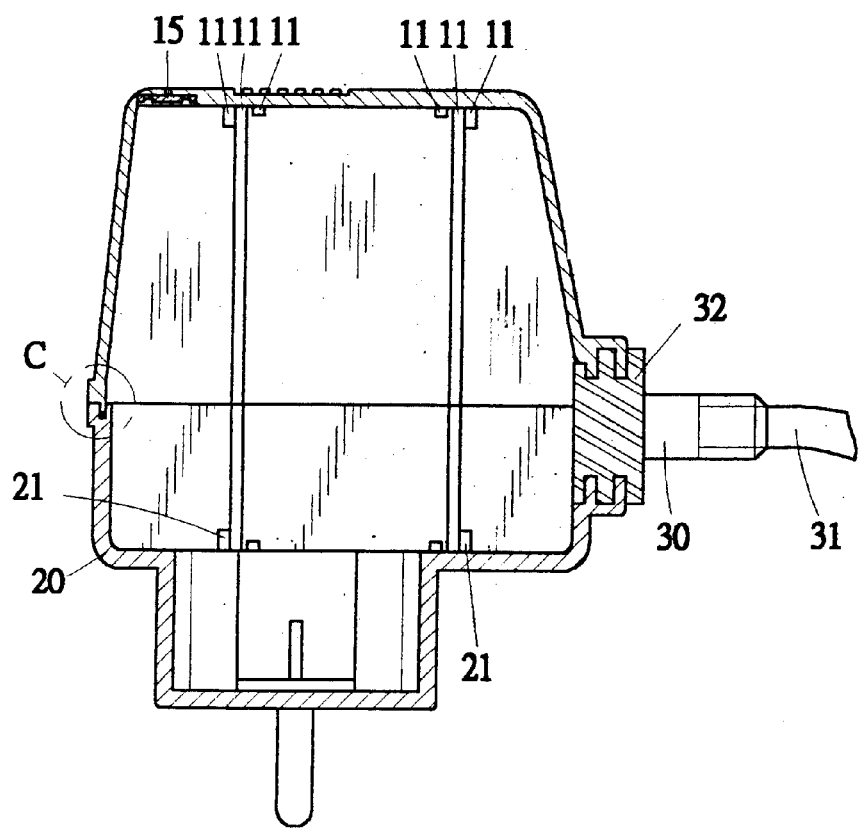
FIG. 8 is a cross-sectional view of the liquid-proof enclosure of FIG. 7.
Figure 9:
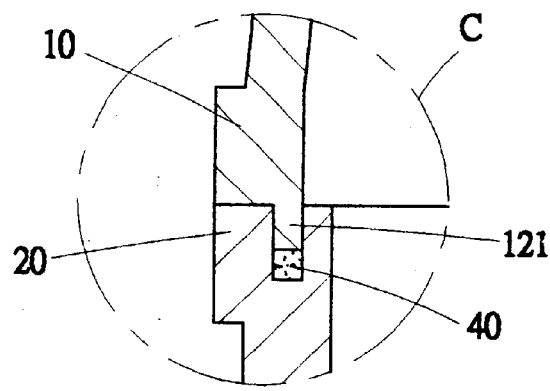
FIG. 9 is an enlarged view of encircled portion C of FIG. 8.

FIGS. 7–9 shows a second embodiment of the enclosure 100 in accordance with the present invention. The enclosure of the second embodiment has an overall structure substantially identical to that of the first embodiment except a resilient gasket 40 is received in the slot 221 of the second casing member 20 whereby when the securing rib 121 of the first casing 10 is fit into the slot 221, the gasket 40 is tightly sandwiched between the securing rib 121 and the slot 221 to realize excellent liquid-proofness.

Figures 10, 11:
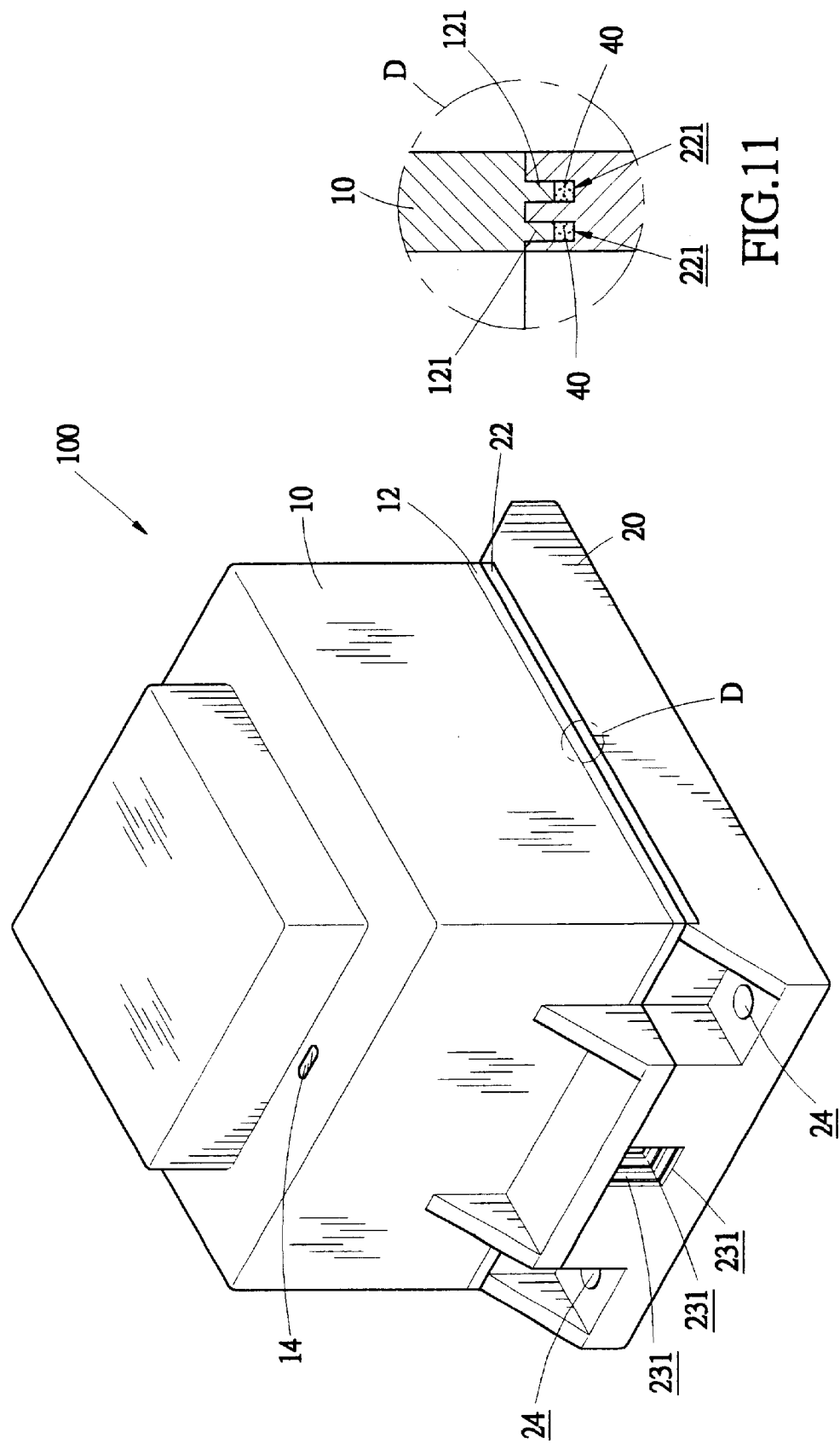
FIG. 10 is a perspective view of a surface-mounted liquid-proof enclosure constructed in accordance with a third embodiment of the present invention.
FIG. 11 is an enlarged, cross-sectional view of encircled portion D of FIG. 10.
Figure 12:
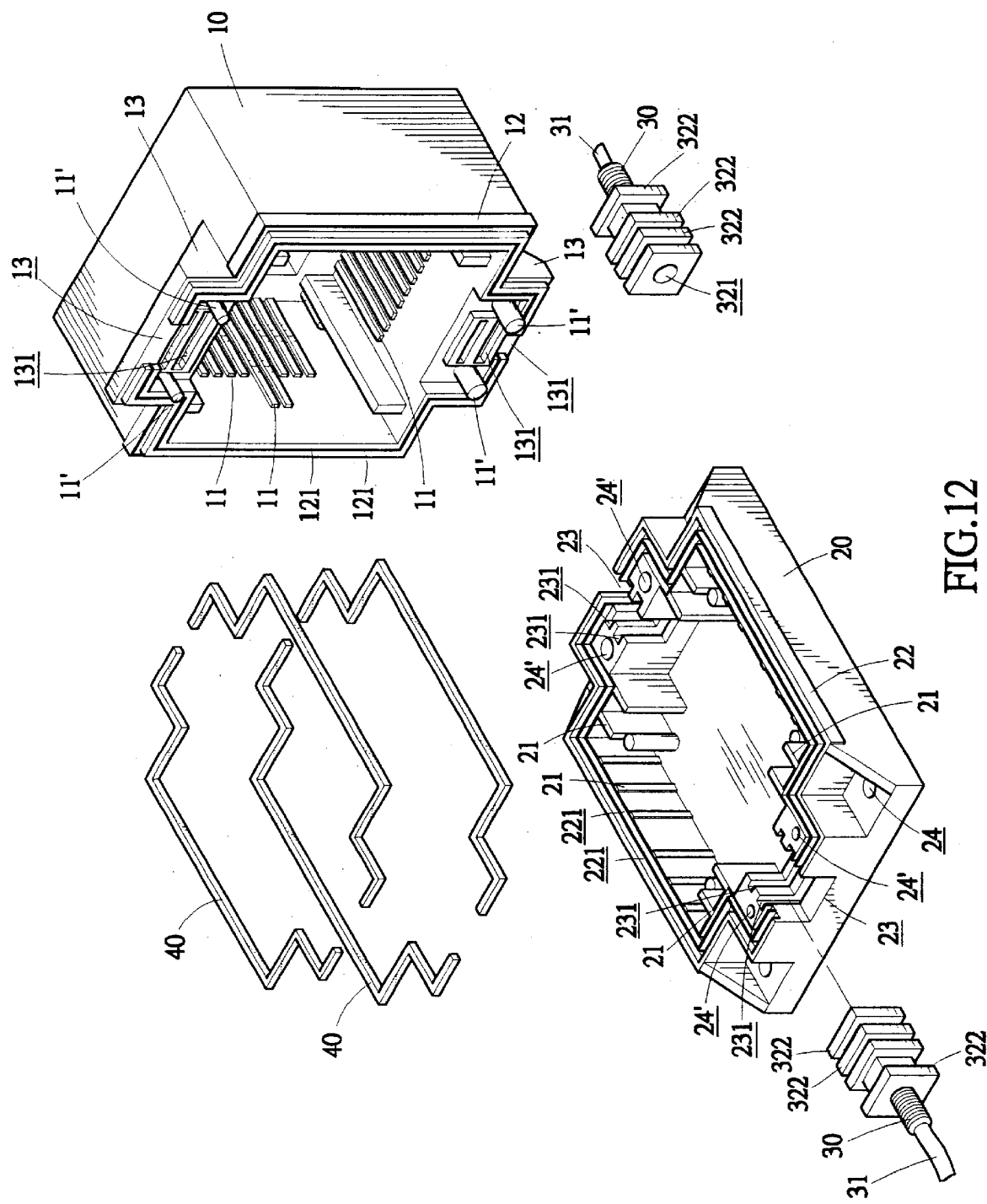
FIG. 12 is an exploded view of the liquid-proof enclosure of FIG. 10.

FIGS. 10–12 shows a third embodiment of the enclosure 100 in accordance with the present invention. The enclosure 100 of the third embodiment is a surface-mounted enclosure adapted to be placed on and secured to a horizontal surface, such as ground or a table. The enclosure 100 comprises first and second casing members 10, 20 inside which support ribs 11, 21 are formed for supporting a transformer (not shown in FIGS. 10–12) similar to that of the first embodiment illustrated with reference to FIGS. 1–6. The second casing member 20 has an anchoring flange (not labeled) in which holes 24 are defined for receiving fasteners (not shown) securing the enclosure 100 to for example the ground. Positioning pins 11' and corresponding bores 24' are respectively formed on the first and second casing members 10, 20 for properly positioning the casing members 10, 20 with respect to each other by inserting the pins 11' into the bores 24'. Each casing member 10, 20 has a mating flange 12, 22. Two ribs 121 are formed on the mating flange 12 of the first casing member 10 and two slots 221 are defined in the mating flange 22 of the second casing member 22 for receiving and engaging the ribs 121 thereby attaching the casing members 10, 20 to each other. Gaskets 40 are received in the slots 221 and tightly sandwiched between the ribs 121 and the slots 221 for excellent liquid-proofness. Each casing member 10, 20 forms two cutouts 13, 23 on opposite side walls thereof, serving as inlet passages of power cables 31. Two slots 131, 231 are respectively defined in a side wall of each cutout 13, 23 for receiving ribs 322 of a cable retainer 30 retaining the power cable 31 thereby attaching the power cables 31 to the enclosure 100. Each cable retainer 30 defines a bore 321 through which conductors (not shown) of the power cable 31 extends into the enclosure 100.

Figure 13:
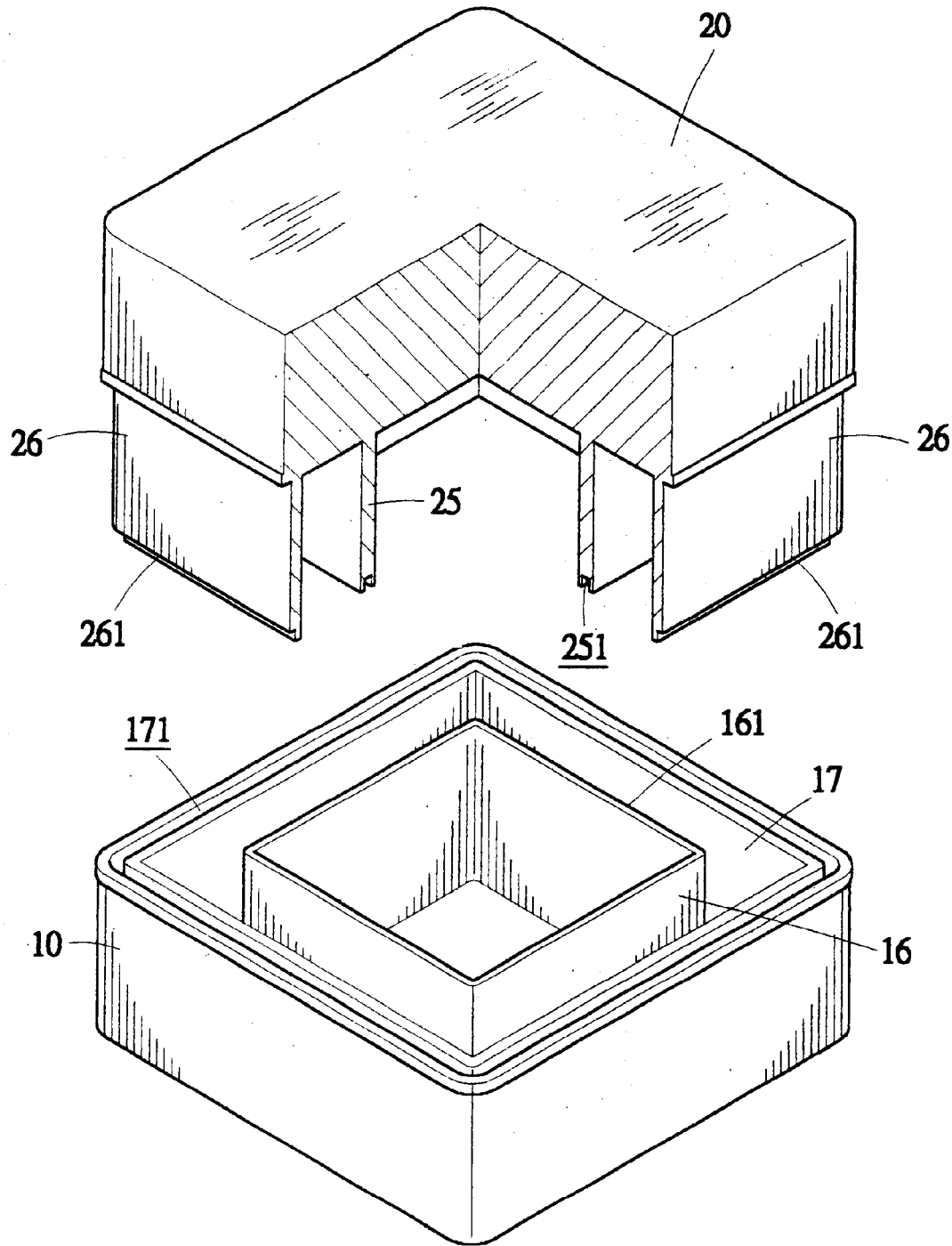
FIG. 13 is an exploded view of a liquid-proof enclosure constructed in accordance with a fourth embodiment of the present invention.
Figure 14:
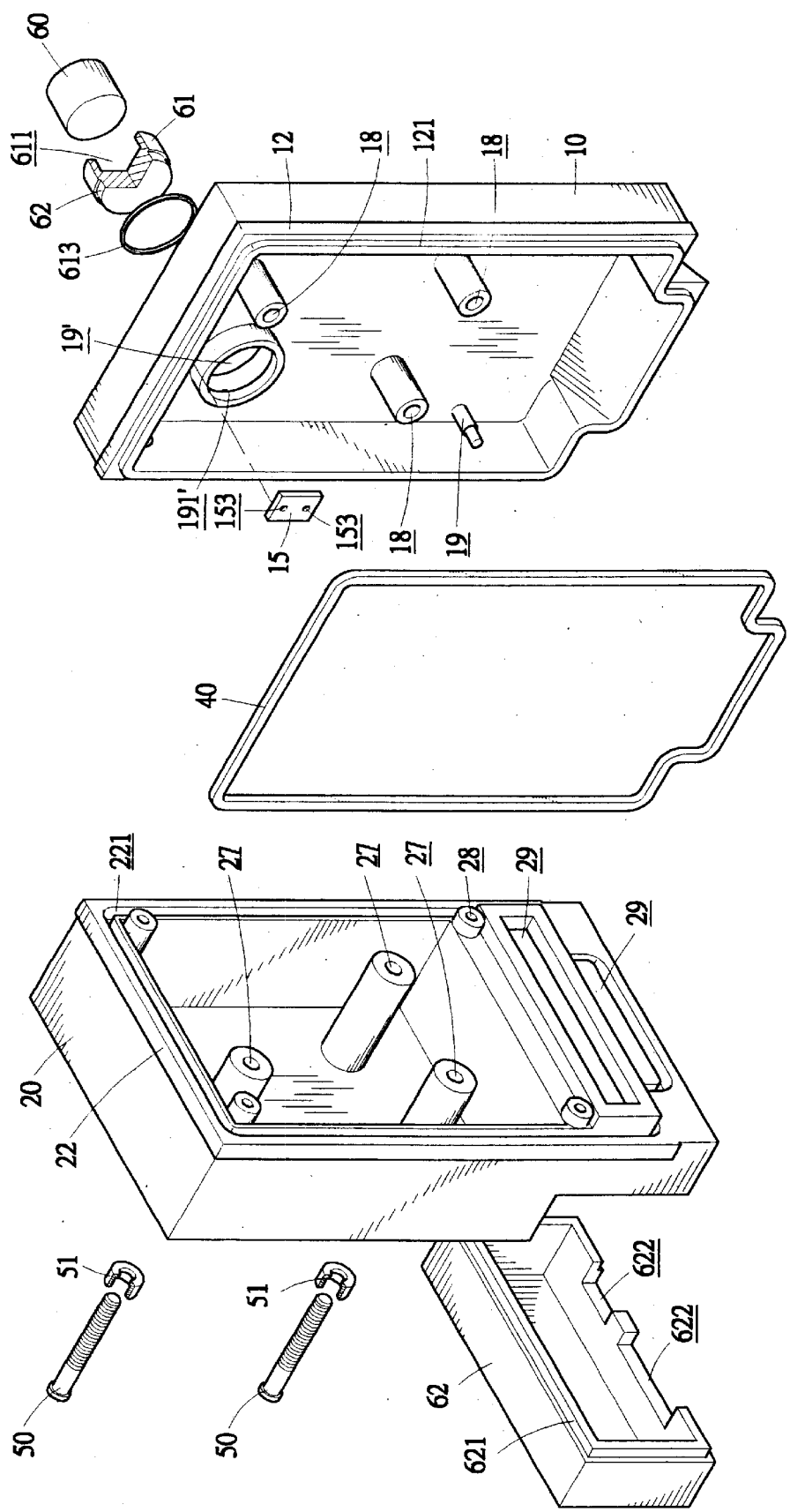
FIG. 14 is an exploded view of a liquid-proof enclosure constructed in accordance with a fifth embodiment of the present invention.
Figure 15:
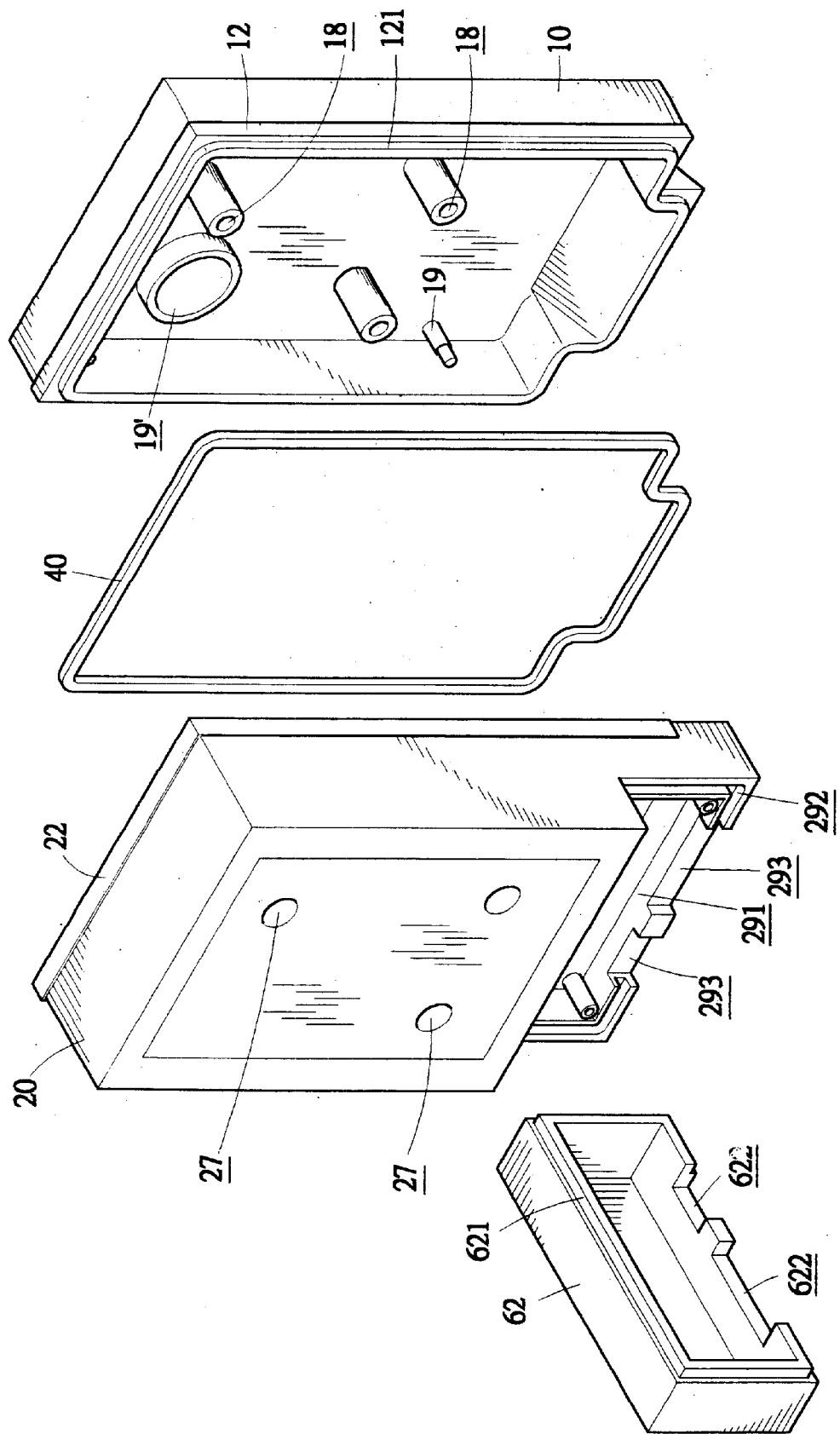
FIG. 15 is another exploded view of the liquid-proof inclosure of FIG. 14 taken from a different perspective.
Figure 16:
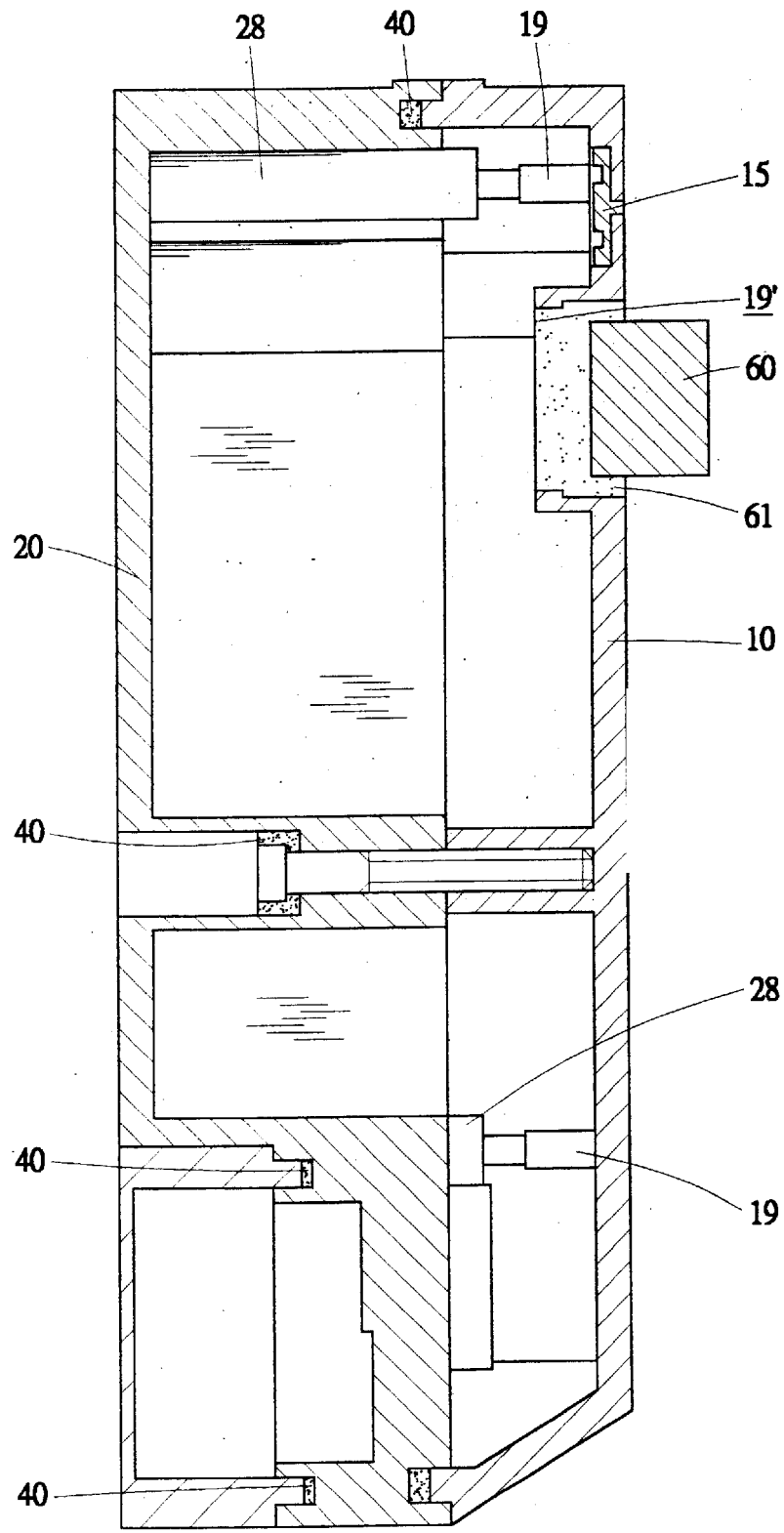
FIG. 16 is a cross-sectional view of the liquid-proof enclosure of FIG. 14.
Figure 17:
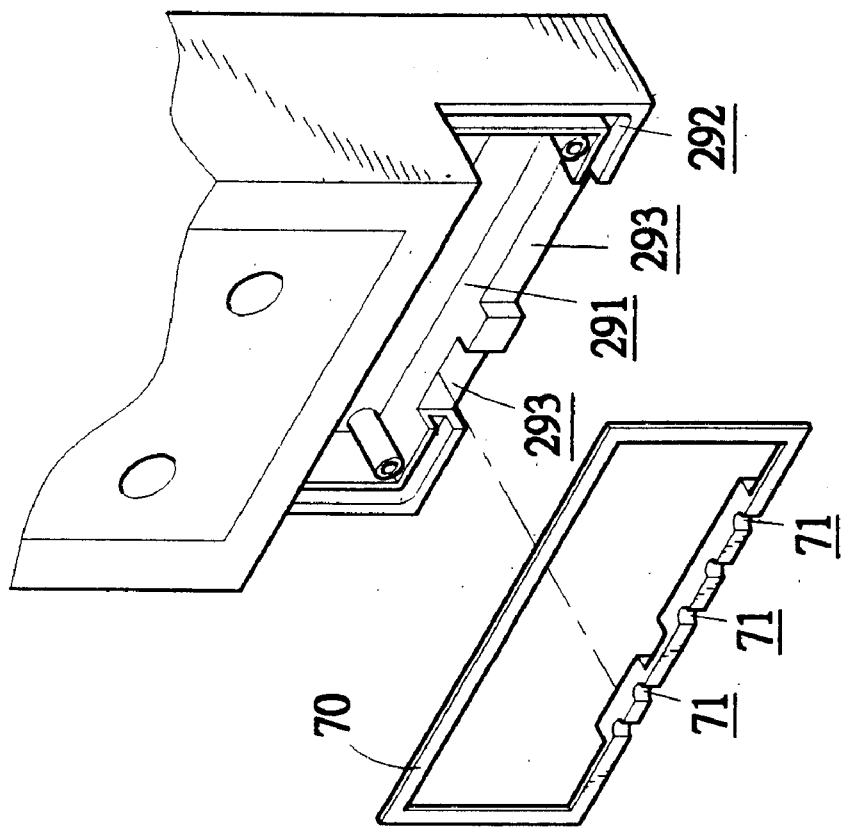
FIG. 17 is an exploded view of a portion of the liquid-proof enclosure of FIG. 14 showing the spatial relationship between a cable chamber of the enclosure and a cover.
Figure 17:
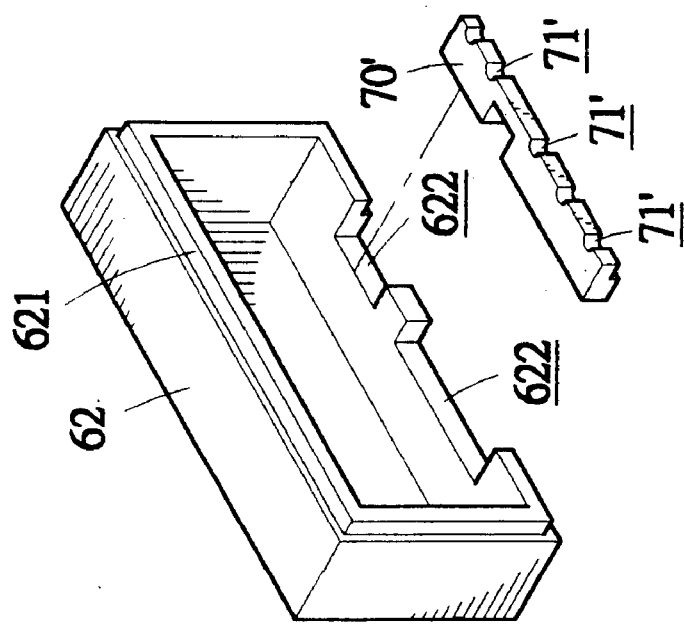

FIG. 13 shows a fourth embodiment of the enclosure 100 in accordance with the present invention. The enclosure 100 of the fourth embodiment comprises first and second casing members 10, 20 each having an inner wall 16, 25 and an outer wall 17, 26 for respectively accommodating a transformer and related circuit and parts. A rib 161 is formed on a free edge of the inner wall 16 and a corresponding slot 251 is defined in a free edge of the inner wall 25 for receiving and engaging the rib 161. A rib 261 is formed on a free edge of the outer wall 26 and a corresponding slot 171 is defined in a free edge of the outer wall 17 for receiving and engaging the rib 261. By means of the arrangement of inner and outer walls, a more effective liquid-proofness can be achieved.

FIGS. 14–17 shows a fifth embodiment of the enclosure 100 in accordance with the present invention. The enclosure 100 comprises first and second casing members 10, 20 each having a mating flange 12, 22 forming a securing rib 121 and a slot 222. The securing rib 121 is received in the slot 222 for attaching the casing members 10, 20 together. A gasket 40 is received in the slot 222 and tightly sandwiched between the rib 121 and the slot 222 for liquid-proofness. Holes 27 are defined in the second casing member 20 for receiving bolts 50 that engage inner-threaded holes 18 defined in the first casing member 10 to secure the casing members 10, 20 together. A liquid-proof ring or gasket 51 is interposed between each bolt 50 and the corresponding hole 27. Positioning pins 19 are formed in the first casing member 10 for receivingly engaging corresponding bores 28 defined in the second casing member 20 to properly position the casing members 10, 20 with respect to each other.

A knob assembly is attached to the first casing member 10 for controlling the electronics inside the enclosure 100. The knob assembly comprises a liquid-proof plug 61 having an outer surface forming a recess 611 for receiving and retaining a knob member 60. The plug 61 has a reduced inner end 612 forming a circumferential shoulder (not labeled). A bore 19' is defined in the first casing member 10 having a circumferential step 191'. The plug 61 is received in the bore 19' with the shoulder thereof supported by the step 191'. Preferably, a resilient liquid-proof gasket 613 is disposed between the shoulder and the step 191' and surrounding the reduced end 612 for liquid-proofness.

A cable chamber 291 is defined on an outer surface of the second casing member 20. A plurality of passages 29 are defined in the second casing member 20, communicating between the interior space of the enclosure 100 and the cable chamber 291, and thus allowing cables extension from the cable chamber 291 into the enclosure 100. A cover 62 is attached to the outer surface of the second casing member 20, closing the cable chamber 291. A slot 292 is defined along a surrounding wall of the cable chamber 291 and a corresponding rib 621 is formed along a free edge of a surrounding wall of the cover 62. The rib 621 is received in the slot 292 for attaching the cover 62 to the outer surface of the second casing member 20. Fastening means may be employed to securely fix the cover 62 to the second casing member 20. Ultrasonic welding is an example of the fastening means. Corresponding openings 293 and 622 are respectively defined in the walls of the cable chamber 291 and the cover 62. Resilient liquid-proof gaskets 70, 70' are received and retained in the slot 292 and the openings 293, 622 of the cable chamber 291 and the cover 62 for liquid-proofness. Notches 71, 71' are defined in the gaskets 70, 70' for inlet of cables.

In view of the above, it is understood that the spirit of the present invention is to provide a leakage free, liquid-proof enclosure of simple structure for receiving and protecting electronic or electrical devices whereby electronics or electrical elements encased in the enclosure 100 of the present invention can be well protected from humidity and damage so caused thereby.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An enclosure comprising:

first and second casing members, each of said casing members having a mating flange formed thereon, said mating flanges engaging one another to releasably lock said first casing member to said second casing member, said first and second casing members defining an interior space, said interior space being adapted to receive, retain and protect an electrical device, a slot being defined along said mating flange of said second casing member, said slot corresponding to and receivingly engaging a rib formed on said mating flange of said first casing member for releasably locking said first and second casing members together and releasably sealing said first and second casing members to one another, an opening being defined between said first and second casing members, at least one circumferential slot being defined along a side wall of said opening;

a plurality of support ribs formed on an inner surface of each of said first and second casing members for supporting and retaining an electrical device; and a cable retainer adapted to retain a cable, said cable retainer having cable ribs formed thereon, said cable ribs receiving and engaging said circumferential slot of said opening for attaching said cable retainer to said first and second casing members and for preventing liquid leakage into said enclosure.

2. The enclosure as claimed in claim 1, wherein an opening is defined in the first casing member with a lens member received and retained in the opening.

3. The enclosure as claimed in claim 1 further comprising a liquid-proof gasket received in the slot of the second casing member and tightly sandwiched between the rib of the first casing member and the slot of the second casing member.

* * * * *